United States Patent
DuBois et al.

(10) Patent No.: US 10,294,035 B2
(45) Date of Patent: May 21, 2019

(54) CONVEYOR ROLL ASSEMBLY, USE THEREOF AND END CAP FOR A CONVEYOR ROLL

(71) Applicant: VESUVIUS FRANCE, S.A., Feignies (FR)

(72) Inventors: Laurent DuBois, Rousies (FR); Etienne Schabaillie, Trith Saint Leger (FR)

(73) Assignee: VESUVIUS FRANCE, S.A., Feignies (FR)

( * ) Notice: Subject to any disclaimer, the term of this patent is extended or adjusted under 35 U.S.C. 154(b) by 0 days.

(21) Appl. No.: 16/088,869

(22) PCT Filed: Mar. 30, 2017

(86) PCT No.: PCT/EP2017/057609
§ 371 (c)(1),
(2) Date: Sep. 27, 2018

(87) PCT Pub. No.: WO2017/167920
PCT Pub. Date: Oct. 5, 2017

(65) Prior Publication Data
US 2019/0106281 A1    Apr. 11, 2019

(30) Foreign Application Priority Data

Mar. 31, 2016 (EP) ..................... 16163337

(51) Int. Cl.
*B65G 39/02* (2006.01)
*F27D 3/02* (2006.01)
(Continued)

(52) U.S. Cl.
CPC ............ *B65G 39/02* (2013.01); *C03B 35/181* (2013.01); *C03B 35/186* (2013.01);
(Continued)

(58) Field of Classification Search
CPC ........ B65G 13/04; B65G 39/02; B65G 39/00; F28F 5/02; C03B 35/18; F27D 3/026; F27B 9/2407
(Continued)

(56) References Cited

U.S. PATENT DOCUMENTS

| | | |
|---|---|---|
| 3,867,748 A | 2/1975 | Miller |
| 4,242,782 A | 1/1981 | Hanneken et al. |

(Continued)

FOREIGN PATENT DOCUMENTS

| | | |
|---|---|---|
| DE | 102011084218 A1 | 12/2012 |
| EP | 1853866 B1 | 7/2008 |
| GB | 2051034 A | 1/1981 |

*Primary Examiner* — James R Bidwell
(74) *Attorney, Agent, or Firm* — Thomas Clinton; Donald M. Satina

(57) ABSTRACT

An integral metal end cap for use in a conveyor roll assembly is suitable for use in an environment subject to significant temperature variation. The metal end cap comprises a first end connectable to rotary means, and a second end comprising an integral body adapted to fit over the end of a ceramic spool. The integral body contains a torque transmission portion having a plurality of deformable strips enabling transmission of torque during temperature variations. A conveyor roll assembly comprises a ceramic spool having a longitudinal axis and, at least at one end of the ceramic spool, a metal end cap as described.

9 Claims, 1 Drawing Sheet

(51) Int. Cl.
*F27B 9/24* (2006.01)
*C03B 35/18* (2006.01)

(52) U.S. Cl.
CPC .......... *F27B 9/2407* (2013.01); *F27B 9/2469* (2013.01); *F27D 3/028* (2013.01)

(58) Field of Classification Search
USPC ....... 198/780, 790, 791; 193/37; 492/16, 42, 492/47
See application file for complete search history.

(56) References Cited

U.S. PATENT DOCUMENTS

| | | | | |
|---|---|---|---|---|
| 4,399,598 | A | * | 8/1983 | Page .................... B65G 39/02 432/246 |
| 4,404,011 | A | | 9/1983 | McMaster |
| 4,553,931 | A | * | 11/1985 | Wachi ................... B65G 39/02 193/37 |
| 5,048,168 | A | * | 9/1991 | Vanaschen ............ B65G 23/04 492/47 |
| 5,146,675 | A | * | 9/1992 | Ford ..................... B65G 39/09 492/47 |
| 5,316,129 | A | | 5/1994 | Daily |
| 5,353,919 | A | * | 10/1994 | Buchner ............... F27B 9/2407 193/37 |
| 5,370,596 | A | | 12/1994 | Compagnon |
| 5,906,567 | A | | 5/1999 | Gautier |
| 6,620,084 | B2 | * | 9/2003 | Daily .................... C03B 35/186 492/45 |
| 7,913,835 | B2 | * | 3/2011 | Gautier ................. B65G 39/00 193/35 R |
| 2010/0126823 | A1 | * | 5/2010 | Gautier ................. B65G 39/00 193/37 |

* cited by examiner

CONVEYOR ROLL ASSEMBLY, USE THEREOF AND END CAP FOR A CONVEYOR ROLL

CROSS-REFERENCE TO RELATED APPLICATIONS

This application is a U.S. national stage application, filed under 35 U.S.C. § 371, of International Application No. PCT/EP2017/057609, which was filed on Mar. 30, 2017, and which claims priority to European Application No. EP 16163337.5, filed Mar. 31, 2016, the contents of each of which are incorporated by reference in to this specification.

BACKGROUND OF THE INVENTION

(1) Field of the Invention

The present invention relates to a conveyor roll assembly suitable for use in an environment subject to significant temperature variations, to the use of such assembly as well as to an end cap that can be used in such assembly.

(2) Description of the Related Art

A conveyor roll assembly suitable for use in an environment subject to significant temperature variations may comprise a ceramic spool having metal end caps. Typically, the ceramic spool comprises fused silica. The end caps permit an easy mounting to a bearing or drive wheel. For example, in glass tempering applications, a series of ceramic spools support glass sheets, and the end caps permit mechanical coupling thereby to a drive mechanism. The end caps should securely adhere to the spool, thereby permitting the spool to rotate at the desired speed.

The different thermal expansions of the ceramic spool and the metal end caps makes securely fastening the end caps to the spool difficult and can create eccentric rotations or breakages when heated or on cooling. Eccentric rotation is generally undesirable, as this would create an uneven support surface for the glass sheet or speed variations leading to scratches. Various methods have been proposed to overcome this difficulty. U.S. Pat. No. 3,867,748 teaches fastening end caps to a spool using an adhesive. U.S. Pat. No. 4,242,782 proposes fastening end caps using rubber O-rings. Adhesives and O-rings can become pliable and lose holding power at elevated temperatures causing eccentric rotation of the spool and slippage between the end caps and the spool. If, by accident, the adhesive and O-ring have been subjected to such elevated temperatures, they permanently lose their holding power so that even when the temperature returns to its normal value, slippage is still observed. For this reason, the fastening of end caps to a spool using adhesive or O-ring is limited to applications at low temperature (lower than 250° C.).

Metallic connectors have also been used to secure an end cap to a spool. U.S. Pat. Nos. 5,316,129 or 4,404,011 describes the use of a helically wound coil between the spool and the end cap. The coil includes bent portions and straight portions that permit continuous contact between the end cap and the spool despite disparate thermal expansion coefficients. The flat sided spring coil of this document consists in a succession of relatively long portions which are relatively thin. In these conditions, a significant flexibility of the coil elements is observed. Consequently, to obtain a torque sufficient to secure the end cap to the spool, it is necessary to pre-stress the coil very significantly. If the temperature increases accidentally (temporary overheat), the torque and consequently the fastening of the end cap to the spool are lost. Moreover, when the system cools down, the torque is not recovered. U.S. Pat. Nos. 5,906,567 and 5,370,596 describe curved bimetallic shims for securing the end cap to the spool. The curvature of the bimetallic shims changes with temperature thereby retaining a secure attachment between the spool and the end cap. Assembling and repairing a coil spring or bimetallic system can, however, be difficult. In addition, such metallic connectors are particularly adapted to specific temperature ranges (generally 400° C. and higher). Outside of this range, eccentric rotation can be observed.

Another problem which is often observed with the conveyor rolls of the prior art is that of jamming. For example, in case the conveyed article is blocked or in case of mechanical seizing, the drive mechanism will continue to operate and will transmit a moment of torsion to the end cap. In these conditions, either the ceramic spool or the fastening means will break.

EP-B1-1853866 solves these problems by providing a conveyor roll assembly comprising an end cap with a tolerance ring interposed between the end cap and the end of the ceramic spool that fixedly and centrally secures the end caps to a ceramic spool within a wide range of application temperatures. As the transmitted torque value might decrease at high temperature with time, these end caps provide a transmission torque range up to several hundred N.m. and resist a temporary overheat. However, these end caps system are most of the time oversized.

Other drawbacks of end caps comprising a tolerance ring are that they are made of at least two separate parts requiring an assembly step and are relatively expensive due to the size and design of the end caps.

DE-A1-10,2011,084,218 discloses an end cap for carrier roll having ceramic roller body. The end cap comprises a shaft end for rotatable support and a receptacle for the roll body. The receptacle is formed by at least two segments that are separated by a hole and are integral with a connection plate. The segments having a conical contact surface collaborate with an adjustable actuating element which has also a conical contact surface. The segments have inwardly projecting extensions fitting in roller body recesses and blocking relative rotation between the roll body and the endcap. The torque is transmitted by using a cone ring which tightens the endcap to the spool. The torque transmission is done by contact pressure and not by friction. The drawbacks of this end cap are the following: the end cap is made of at least 3 pieces (endcap, nut, cone ring), a specific tightening must be done for each roll at both ends. In addition, the thickness of the end caps is important to ensure a good tightening. The end caps must then be installed outside the walls of the oven leading to a longer total length of the spool.

GB-A-2,051,034 describes an assembly of a spool and a resilient sleeve put in rotation by laying on an endless belt. The entire surface of the sleeve is used to transmit the torque while a pin is required to prevent lateral movement of the spool. The length of the spool must be longer to cross the furnace wall as the sleeve must be located outside the furnace walls. The resiliency of the sleeve is indeed not sufficient to tolerate significant temperature variations. The installation is also cumbersome.

BRIEF SUMMARY OF THE INVENTION

The present invention concerns a conveyor roll (1) assembly suitable for use in an environment subject to significant temperature variations comprising a) a ceramic spool (2) having a longitudinal axis; and
b) at least at one end of the ceramic spool, a metal end cap (3) comprising a first end (4) connectable to rotary means, or a roll rotator, and a second end comprising
an integral body having two ends, an internal diameter D adapted to fit over the end of the ceramic spool and a length L>0.3 D or >0.5 D,
said integral body comprising at least three consecutive portions along the longitudinal axis of the integral body, the two end portions of the integral body comprising a substantially continuous surface, said integral body comprising,
between the two end portions, one torque transmission portion;
said torque transmission portion comprising a plurality of openings (6) of a length Lb<L in the direction of the longitudinal axis of the body, defining between the openings a plurality of strips (7) extending inwardly and being mechanically and resiliently deformed so as to transmit the torque to the spool. The invention also relates to the metal end cap as described.

BRIEF DESCRIPTION OF THE DRAWINGS

The invention will be better understood from reading the description which will follow, given solely by way of examples and made with reference to the drawings in which.

DETAILED DESCRIPTION OF THE INVENTION

Figure 1:
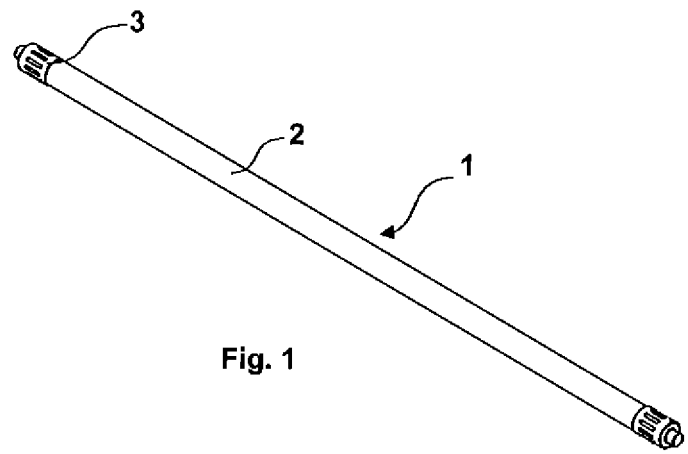
FIG. 1 is a perspective view of an assembly of a conveyor roll according to one embodiment of the invention.
Figure 2:
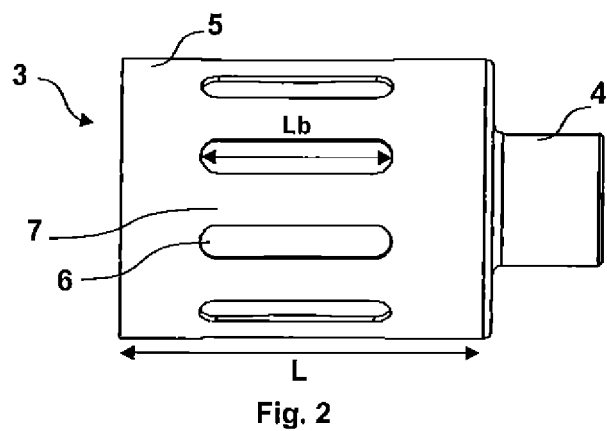
FIG. 2 is a perspective view of the end cap of the assembly according to one embodiment of the invention.
Figure 3:
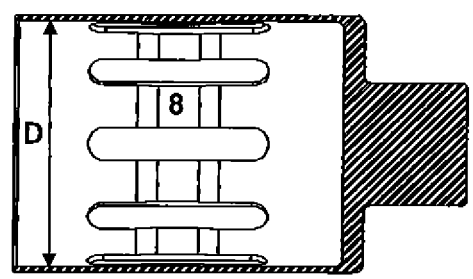
FIG. 3 is a cross-sectional view of the end cap of FIG. 2.

FIG. 1 depicts an assembly (1) according to the present invention of a conveyor roll comprising a ceramic spool (2) and two metallic end caps (3). The length L represents the length of the second end (5) of the end cap as shown in FIG. 2, wherein the second end (5) of the end cap is configured to receive a portion of ceramic spool (2). FIG. 3 depicts the internal view of the end cap. The thicker portion (8) is a portion with two slopes leading to a raised floor.

The new end cap described herein was developed to solve the cited problems and has the advantage of being simpler and less expensive to assemble than the end cap described in EP-B1-1853866 and in DE-A1-10,2011,084,218. This new end cap ensures an efficient torque transfer from a rotary drive means to a ceramic spool because of the resilience produced by the end cap deformation during the assembly of the end cap on the ceramic spool. It has been established by the inventors that a minimum of transmission torque value is sufficient to bring the rolls into rotation for the application and the assembly according to the invention is able to provide it.

As a result of the symmetry of the end cap, the contacts of the end cap with the ceramic spool are uniformly distributed even at elevated temperatures. The ceramic spool remains perfectly coaxial with the end cap.

Another advantage of this new end cap is its diminished thickness. Constituent material or metal having a thickness of only 1 to 5 mm can be used. The end caps can then be installed in the wall of the oven leading to a shorter required length of the ceramic spool.

The openings in the torque transmission portion of the integral body produce a resiliently deformable portion so as to transmit a torque to the spool. The openings may be longitudinal.

The length (L) of the second end of the end cap is at least >0.3 D or at least >0.5 D; D being the internal diameter measured at the end of the metal end cap receiving the ceramic spool. The end cap is configured to guide correctly the spool even during a temporary overheat and must maintain the spool coaxially with the end cap. An insufficient length also decreases the resilient behaviour expected from the end cap.

The openings can have different shapes; the oblong shape has the advantage of being easy to be manufactured. The resulting strips defined between the openings in the torque transmission portion of the integral body have a rectangular shape which facilitates selecting dimensions to impart desired properties. For each different ceramic spool, calculations of stress and deformation occurring in the end cap may be carried out to determine the size of the openings. The openings may have the same length (i.e., a uniform length) and are parallel to the longitudinal axis of the ceramic spool, or parallel to the longitudinal axis of the integral metal end cap. They may also be distributed uniformly over the whole circumference of the second end of the end cap. The combination of the features of the openings with the features of the strips optimises the distribution of stress due to deformation during the assembly of the end cap on the ceramic spool and during the temperature variations.

The shape of the strips is defined by the shape of the openings.

The strips extend inwardly in the direction of the ceramic spool. In one embodiment, at least one strip has a thicker portion. In a particular embodiment all the strips have a thicker portion to increase the transmitted torque value. The internal diameter of the end cap is thereby decreased in a local area or limited annular area, tensioning the strips and enhancing the contact with the ceramic spool. The thicker portions may be located in the middle of the strips. The sizing of the cap is made easier as explained above. Moreover, the ratio stress on deformation is optimized. With an increase of temperature, the end cap thermally expands while the dimensions of the ceramic spool do not significantly change. Thereby, the fastening power of the end cap decreases and the spool starts slipping in the end cap. When the temperature returns to normal or to ambient temperatures, the end cap returns to its "normal" dimensions and the holding power is integrally recovered without causing eccentric rotation.

The conveyor roll according to the invention can be used for conveying an article, a foil or sheet (for example of glass or metal) for any kind of thermal treatment of the foil or sheet or of a coating applied thereon. This conveyor roll is particularly suitable for transporting flat bottom articles in an environment subject to significant temperature variations.

The ceramic spool (2) generally comprises material suitable material for high temperature application, preferably fused silica, mullite or sillimanite.

The present invention also relates to an integral metal end cap for use in a conveyor roll assembly in an environment subject to significant temperature variations, having a longitudinal axis and comprising a first end connectable to rotary means, or a roll rotator, and a second end comprising an integral body having two ends, an internal diameter D adapted to fit over an end of a ceramic spool and a length L>0.3 D, or >0.5 D, said integral body comprising at least three consecutive portions along the longitudinal axis of the integral body, the two end portions of the integral body comprising a substantially continuous surface, said integral body comprising, between the two end portions, one torque transmission portion, said torque transmission portion comprising a plurality of openings of a length $Lb<L$ in the direction of the longitudinal axis, defining between the openings a plurality of strips extending inwardly and being mechanically and resiliently deformable so as to transmit the torque to the spool.

The first end of the end cap is connected to the driving system by, for instance, a belt or gear wheel. The openings are made by conventional machining means or laser. The strips resulting from the openings have a thicker portion which are also made by conventional machining means. The thicker portion extends inwardly and has preferably the shape of a raised surface between two inclined surfaces.

The metal end cap is lighter than the end cap of EP-B1-1853866 and is cheaper even though a strip machining step is required.

Various features and characteristics of the invention are described in this specification and illustrated in the drawings to provide an overall understanding of the invention. It is understood that the various features and characteristics described in this specification and illustrated in the drawings can be combined in any operable manner regardless of whether such features and characteristics are expressly described or illustrated in combination in this specification. The Inventor and the Applicant expressly intend such combinations of features and characteristics to be included within the scope of this specification, and further intend the claiming of such combinations of features and characteristics to not add new matter to the application. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with the written description requirement under 35 U.S.C. § 112(a). The invention described in this specification can comprise, consist of, or consist essentially of the various features and characteristics described in this specification.

Also, any numerical range recited in this specification includes the recited endpoints and describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will comply with written description, sufficiency of description, and added matter requirements (e.g., 35 U.S.C. § 112(a) and Article 123(2) EPC).

The grammatical articles "one", "a", "an", and "the", as used in this specification, are intended to include "at least one" or "one or more", unless otherwise indicated or required by context. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the invention. Further, the use of a singular noun includes the plural, and the use of a plural noun includes the singular, unless the context of the usage requires otherwise.

LIST OF REFERENCES

1. Conveyor roll assembly
2. Ceramic spool
3. Metal end cap
4. First end of metal end cap
5. Second end of metal end cap
6. Longitudinal openings
7. Strip
8. Thicker portion of strip

The invention claimed is:

1. An integral metal end cap for use in a conveyor roll assembly for use in an environment subject to significant temperature variations, the integral metal end cap having a longitudinal axis and comprising:
   a first end connectable to a roll rotator, and
   a second end comprising an integral body having two ends, an internal diameter D adapted to fit over an end of a ceramic spool and a length $L>0.3$ D, said integral body comprising at least three consecutive portions along the longitudinal axis of the integral body, the two end portions of the integral body comprising a substantially continuous surface, said integral body comprising, between the two end portions, one torque transmission portion, said torque transmission portion comprising a plurality of openings of a length $Lb<L$ in the direction of the longitudinal axis, defining between the openings a plurality of strips extending inwardly and being mechanically and resiliently deformable during assembly of the end cap on the ceramic spool and during temperature variations so as to transmit the torque to the spool.

2. An integral metal end cap according to claim 1 wherein the openings are oblong.

3. An integral metal end cap according to claim 1 wherein the openings are longitudinal, have the same length and are parallel to the longitudinal axis of the integral metal end cap.

4. An integral metal end cap according to claim 1 wherein the openings are distributed uniformly over the whole circumference of the second end of the end cap.

5. An integral metal end cap according to claim 1 wherein the strips extending inwardly comprise a thicker portion.

6. An integral metal end cap according to claim 5 wherein the thicker portion of the strip is in the middle of the strip.

7. An integral metal end cap according to claim 1 wherein the integral body comprises metal having a thickness from and including 1 mm to and including 5 mm.

8. Conveyor roll assembly suitable for use in an environment subject to significant temperature variations comprising:
   a) a ceramic spool having a longitudinal axis;
   b) at least at one end of the ceramic spool, a metal end cap according to claim 1.

9. Conveyor roll assembly according to claim 8 wherein the ceramic spool comprises a material selected from the group consisting of fused silica, mullite, sillimanite, and combinations of any thereof.

* * * * *